United States Patent
Chen (10) Patent No.: US 9,436,067 B2
(45) Date of Patent: Sep. 6, 2016

(54) MOVABLE BRACKET AND CAMERA DEVICE HAVING THE MOVABLE BRACKET

(71) Applicant: VIVOTEK INC., New Taipei (TW)

(72) Inventor: Chih-Hao Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 14/568,897

(22) Filed: Dec. 12, 2014

(65) Prior Publication Data

US 2015/0168815 A1    Jun. 18, 2015

(30) Foreign Application Priority Data

Dec. 13, 2013   (TW) .............................. 102146234 A (51) Int. Cl.
| | |
|---|---|
| *G03B 17/00* | (2006.01) |
| *G03B 17/56* | (2006.01) |
| *F16M 13/02* | (2006.01) |
| *F16M 11/14* | (2006.01) |

(52) U.S. Cl.
CPC ............ *G03B 17/561* (2013.01); *F16M 11/14* (2013.01); *F16M 13/02* (2013.01); *F16M 13/027* (2013.01); *F16M 2200/022* (2013.01)

(58) Field of Classification Search
USPC ................... 396/419, 427, 428; 348/143, 373
See application file for complete search history.

(56) References Cited

U.S. PATENT DOCUMENTS

| | | | | |
|---|---|---|---|---|
| 3,843,272 | A * | 10/1974 | Jorn ............................... | 403/132 |
| 6,328,270 | B1 * | 12/2001 | Elberbaum .............. | 248/288.31 |
| 2010/0157052 | A1 * | 6/2010 | Chang ................ | H04N 5/23241 348/143 |
| 2011/0234889 | A1 * | 9/2011 | Su .......................... | H04N 5/232 348/373 |

FOREIGN PATENT DOCUMENTS

CN          203630502 U       6/2014

* cited by examiner

*Primary Examiner* — Minh Phan
(74) *Attorney, Agent, or Firm* — Maschoff Brennan (57) ABSTRACT

A movable bracket includes a fixing component, a covering component, a movable component and a fastening ring. The fixing component includes a main body, a first interposing part and a first screwing part. The first interposing part and the first screwing part are located at the main body. The covering component includes a second interposing part and a first pressing part. The covering component covers the first interposing part to form a pivoting space between the first interposing part and the second interposing part. The covering component has an adjusting groove connected to the pivoting space. The movable component includes a pivotal part and an assembling part that are opposite. The movable component passes through the adjusting groove. The fastening ring includes a ring body, a second pressing part and a second screwing part. The second pressing part is connected to the ring body surrounding the main body.

19 Claims, 9 Drawing Sheets

MOVABLE BRACKET AND CAMERA DEVICE HAVING THE MOVABLE BRACKET

CROSS-REFERENCE TO RELATED APPLICATIONS

This non-provisional application claims priority under 35 U.S.C. §119(a) on Patent Application No(s). 102146234 filed in Taiwan, R.O.C. on Dec. 13, 2013, the entire contents of which are hereby incorporated by reference.

TECHNICAL FIELD

The disclosure relates to a movable bracket, more particularly to a camera device having the movable bracket.

BACKGROUND

Surveillance cameras are widely disposed on many different kinds of locations such as factories, dormitories, stores, apartments, communities, hallways and some other remote locations. The surveillance camera is for monitoring and recording human behaviors or accidents so that it is favorable for maintaining social control, recognizing threats, and avoiding criminal activities.

Common surveillance cameras are classified as a wide-angle camera or a bullet camera. The wide-angle camera has a greater monitoring range so that it is directly installed on a wall or a ceiling by screws. However, the bullet camera has a smaller field of view so that it is unable to be directly screwed on the wall or the ceiling. Instead, the bullet camera needs to be fixedly installed on a bracket first, and the bracket can rotate relative to the wall, which allows the bullet camera to rotate relative to the wall so as to enlarge the monitoring range of the bullet camera. Moreover, conventional brackets are attached to the wall in fewer angle configurations so that it is unfavorable for adjusting to a desired angle of the conventional bracket.

Moreover, a process of installing the conventional bracket and that of adjusting the angle are too complex to be conveniently operated by a user.

SUMMARY

According to one embodiment of the disclosure, a movable bracket comprises a fixing component, a covering component, a movable component and a fastening ring. The fixing component comprises a main body, a first interposing part and a first screwing part. The first interposing part is located at an end of the main body, and the first screwing part is located at an outer surface of the main body. The covering component comprises a second interposing part and a first pressing part that are connected to each other. The covering component covers the first interposing part so as to form a pivoting space between the first interposing part and the second interposing part. The covering component has an adjusting groove, and the adjusting groove extends through two sides of the second interposing part so as to be connected to the pivoting space. The movable component comprises a pivotal part and an assembling part that are opposite to each other. The movable component passes through the adjusting groove so that the assembling part is exposed to the outside and the pivotal part is located in the pivoting space. The pivotal part is interposed between the first interposing part and the second interposing part. The fastening ring comprises a ring body, a second pressing part and a second screwing part. The second pressing part is connected to an end of the ring body. The second screwing part is located at an inner surface of the ring body. The ring body surrounds the main body so that the second screwing part is detachably screwed to the first screwing part, thereby the second pressing part presses the first pressing part so as to fix the pivotal part between the first interposing part and the second interposing part.

According to another embodiment of the disclosure, a camera device comprises the movable bracket according to the aforementioned disclosure and a camera body for capturing an image. The camera body is disposed on the assembling part of the movable bracket.

BRIEF DESCRIPTION OF THE DRAWINGS

The present disclosure will become more fully understood from the detailed description given herein below, along with the accompanying drawings which are for illustration only, thus are not limitative of the present disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
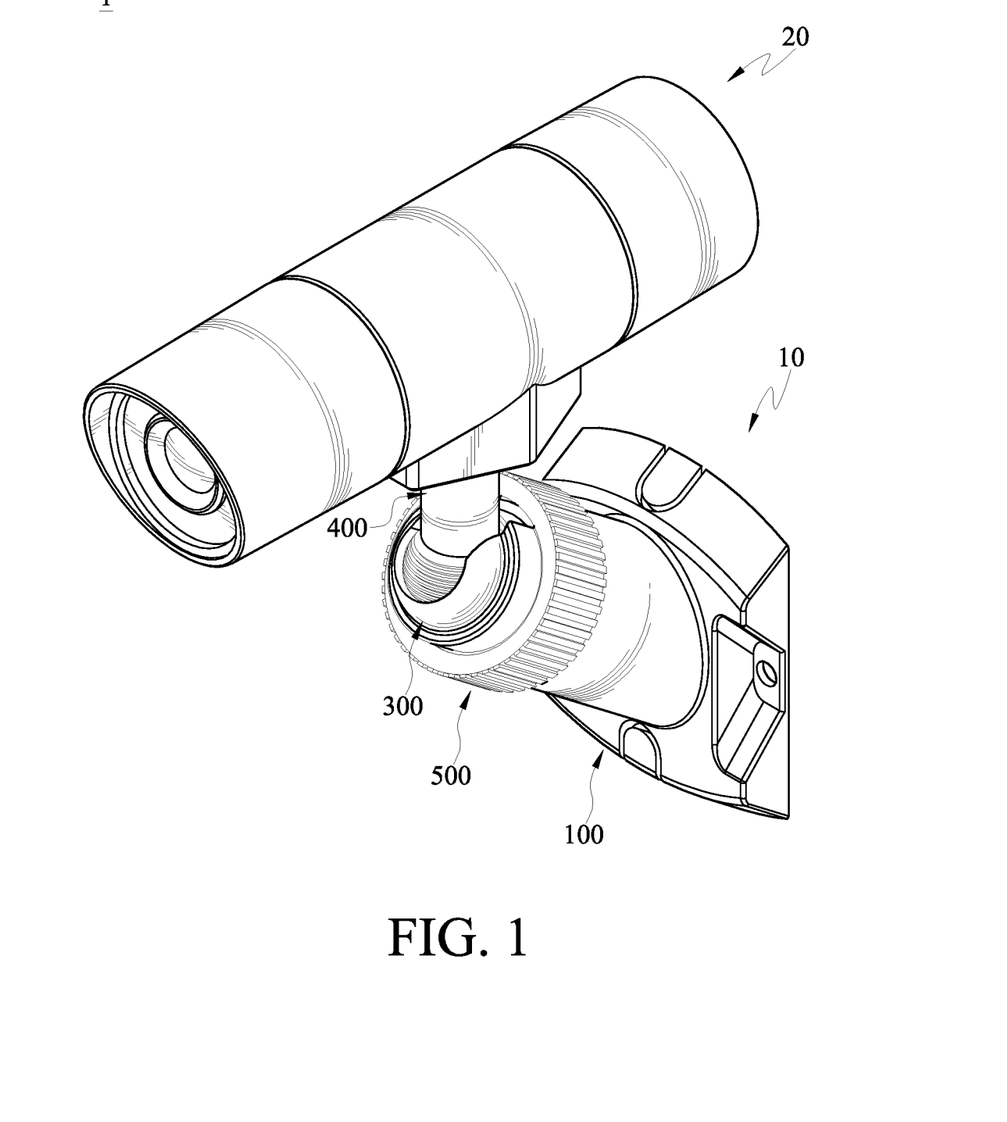
FIG. 1 is a perspective view of a camera device according to a first embodiment.
Figure 2:
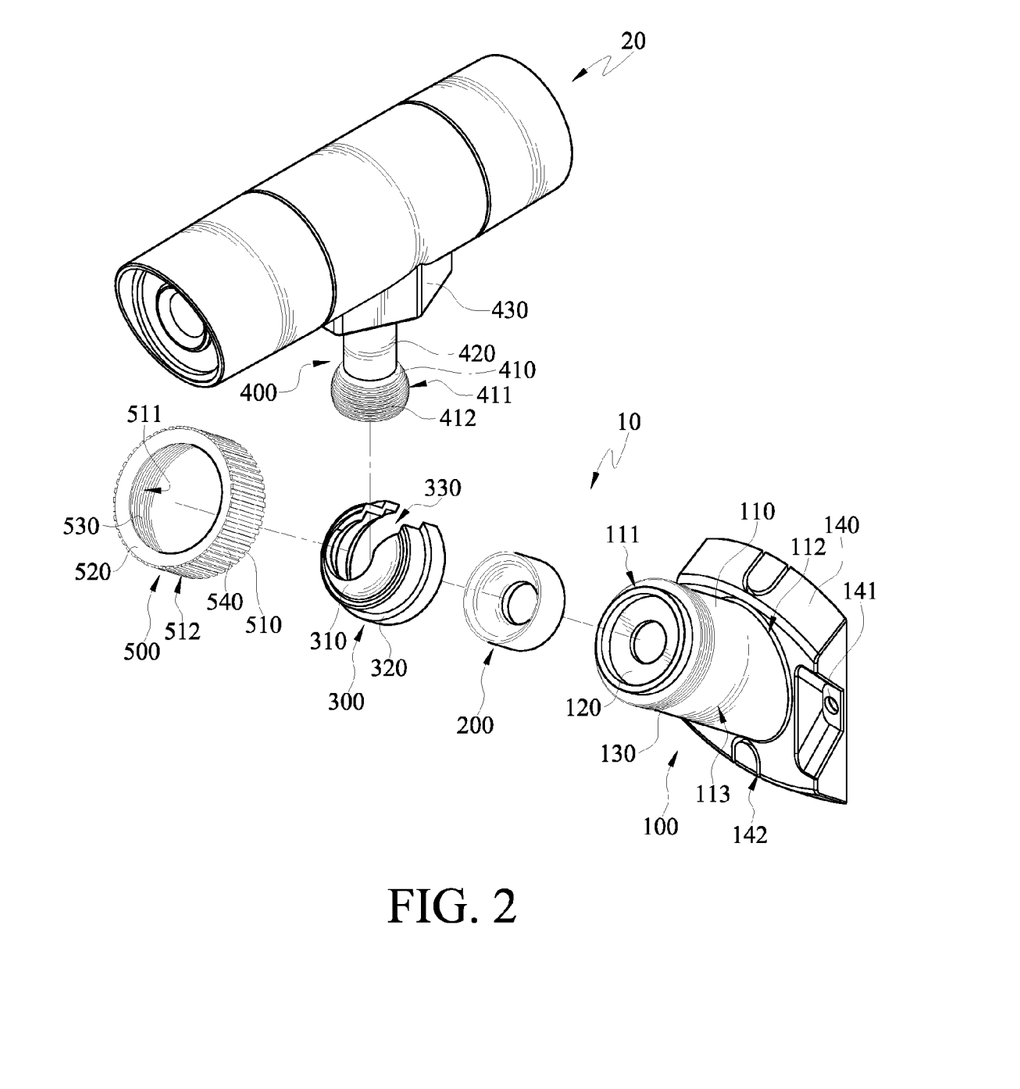
FIG. 2 is an exploded view of the camera device according to the first embodiment.
Figure 3:
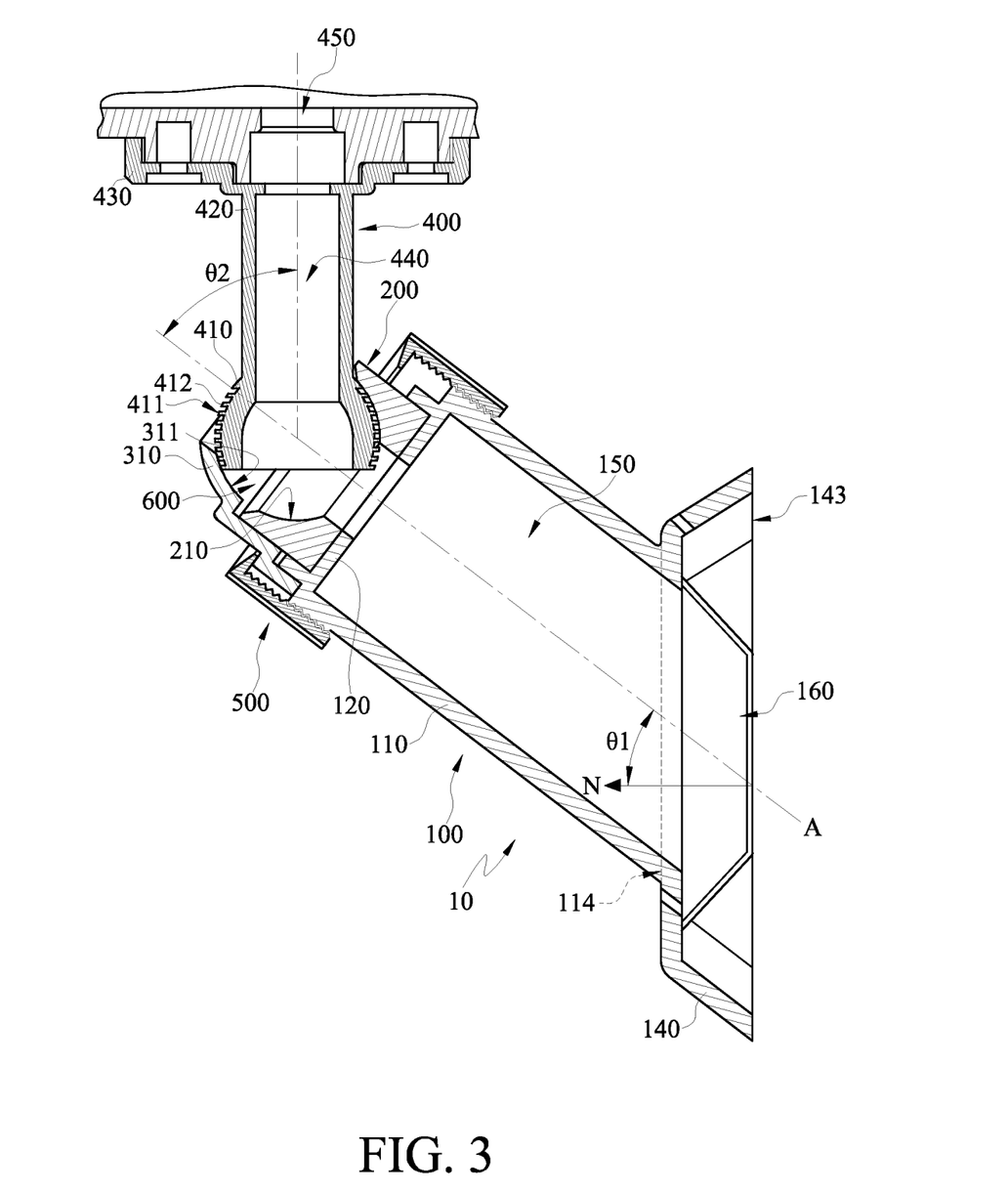
FIG. 3 is a partial cross-sectional view of the camera device in FIG. 1.

Please refer to FIGS. 1, 2 and 3. FIG. 1 is a perspective view of a camera device according to a first embodiment. FIG. 2 is an exploded view of the camera device according to the first embodiment. FIG. 3 is a partial cross-sectional view of the camera device in FIG. 1. In this embodiment, a camera device 1 comprises a movable bracket 10 and a camera body 20. The camera body 20 is disposed on the movable bracket 10. The movable bracket 10 comprises a fixing component 100, an elastic component 200, a covering component 300, a movable component 400 and a fastening ring 500.

The fixing component 100 comprises a main body 110, a first interposing part 120, a first screwing part 130 and a base 140. The main body 110 extends along an axis A. The main body 110 has a pivotal end 111, a connecting end 112, an outer surface 113 and a connecting surface 114. The pivotal end 111 and the connecting end 112 are opposite to each other. The first interposing part 120 has an accommodation space located at the pivotal end 111 of the main body 110.

The first screwing part 130 is, for example, a screw thread located at the outer surface 113 of the main body 110. The first screwing part 130 is close to the pivotal end 111 of the main body 110. The connecting end 112 of the main body 110 is connected to the base 140 via the connecting surface 114. The base 140 has an assembling hole 141 for fixing the fixing component 100 at an installing position (for example, a wall) by nail or screw. The base 140 has a combining surface 143 away from the main body 110, and the combining surface 143 is used for contacting the installing position (for example, a wall).

In this embodiment, the fixing component 100 further has a first wire channel 150. The first wire channel 150 extends through the main body 110 and the base 140 so as to form a first wire opening 160 at the base 140. The base 140 can have at least one wire hole 142 connected to the first wire channel 150. A wire 50 can pass through the wire hole 142 and the wire opening 160 in sequence (please refer to FIG. 4 in advance, which is a cross-sectional view of adjusting an angle of the camera device in FIG. 1). In this embodiment, a plate covers the wire hole 142 initially, and the plate is flipped to expose the wire hole 142 when the wire 50 needs to passes through the wire hole 142.

The axis A and a normal direction of the combining surface 143 enclose an angle θ1. In this embodiment, the angle θ1 is an acute angle about 37 degrees, but the disclosure is not limited thereto. Furthermore, in this embodiment, the movable bracket 10 is installed on the installing position via the base 140 of the fixing component 100, but the disclosure is not limited thereto. In some other embodiments, the fixing component 100 does not comprise the base 140, and the fixing component 100 can be installed on the installing position via the main body 110 with the connecting surface 114 of the fixing component 100 contacting the installing position.

The elastic component 200 is, for example, a supporting gasket or pad. The elastic component 200 has a pressed surface 210, and is made of rubber or silica gel.

The covering component 300 comprises a second interposing part 310 and a first pressing part 320 that are connected to each other. The covering component 300 covers the first interposing part 120 and the elastic component 200 so as to form a pivoting space 600 between the first interposing part 120 and the second interposing part 310. The covering component 300 has an adjusting groove 330, and the adjusting groove 330 extends through two sides of the second interposing part 310 so as to be connected to the pivoting space 600.

The movable component 400 comprises a pivotal part 410, a connecting part 420 and an assembling part 430. The connecting part 420 has two ends that are opposite to each other, one end is connected to the pivotal part 410 and the other is connected to the assembling part 430, so that the pivotal part 410 and the assembling part 430 are opposite to each other with respect to the connecting part 420. The connecting part 420 of the movable component 400 passes through the adjusting groove 330, so that the assembling part 430 is exposed to the outside and the pivotal part 410 is located in the pivoting space 600. The pivotal part 410 is interposed between the first interposing part 310 and the elastic component 200. The pivotal part 410 has a hemispherical surface 411, the second interposing part 310 has a second curved surface 311, and the pressed surface 210 of the elastic component 200 is also a curved surface. Both of the second curved surface 311 and the pressed surface 210 face towards the hemispherical surface 411, and the second curved surface 311 and the pressed surface 210 together cover the pivotal part 410. Therefore, since the second curved surface 311 and the pressed surface 210 closely contact the hemispherical surface 411, the pivotal part 410 is securely interposed in the pivoting space 600.

In this embodiment, the connecting part 420 is for moving along the adjusting groove 330 so that the movable component 400 is for pivoting relative to the fixing component 100 with the pivotal part 410 as a center of pivot, thereby adjusting a position of the assembling component 430 of the movable component 400. In this embodiment, the movable component 400 pivots relative to the fixing component 100 and the movable component 400 and the axis A enclose a pivoting angle θ2. A maximum of the pivoting angle θ2 of the connecting part 420 is 53 degrees, but the disclosure is not limited thereto. The covering component 300 is for rotating relative to the main body 110 of the fixing component 100 with the axis A as a center of rotation. Therefore, the position of the adjusting groove 330 is adjustable so that the movable component 400 is for pivoting relative to the fixing component 100 along various directions, which enhances the range of the rotation of the fixing component 100.

The movable component 400 has a second wire channel 440. The second wire channel 440 extends through the pivotal part 410, the connecting part 420 and the assembling part 430 so as to form a second wire opening 450 at the assembling part 430. The first wire channel 150 is communicated with the second wire channel 450. The wire 50 passes through the second wire opening 450 so as to be electrically connected to the camera body 20.

The pivotal part 410 of the movable component 400 has a ribbed structure 412 located at the hemispherical surface 411. The ribbed structure 412 presses the pressed surface 210 of the elastic component 200. In this embodiment, the ribbed structure 412 has a plurality of annular slits arranged in groups, and a gap is located between any two adjacent slits, but the disclosure is not limited thereto. In some other embodiments, the ribbed structure 412 can comprises a plurality of threads.

The fastening ring 500 comprises a ring body 510, a second pressing part 520 and a second screwing part 530. The ring body 510 has an inner surface 511 and an outer surface 512. The second pressing part 520 is connected to an end of the ring body 510. The second screwing part 530 is located at the inner surface 511 of the ring body 510. The outer surface 512 of the ring body 510 comprises a plurality of ribs 540 for enhancing friction, and therefore it is favorable for a user to grasp the ribs 540 to easily apply a force on the ring body 510. In addition, the ring body 510 surrounds the main body 110 of the fixing component 100 so that the second screwing part 530 is detachably screwed to the first screwing part 130, thereby the fastening ring 500 has a fastening position and a releasing position. When the fastening ring 500 is located at the fastening position, the second pressing part 520 presses the first pressing part 320; when the fastening ring 500 is located at the releasing position, the second pressing part 520 is separated from the first pressing part 320. In detail, when the fastening ring 500 is screwed from the releasing position to the fastening position (that is, the fastening ring 500 is relatively locked to the fixing component 100), the fastening ring 500 moves towards the connecting end 112 of the fixing component 100 so that the second pressing part 520 presses the first pressing part 320, thereby fixing the pivotal part 410 of the movable component 400 between the first interposing part 120 of the fixing component 100 and the second interposing part 310 of the covering component 300. When the fastening ring 500 is screwed from the fastening position to the releasing position (that is, the fastening ring 500 is relatively loosened from the fixing component 100), the fastening ring 500 moves away from the connecting end 112 of the fixing component 100 so that the second pressing part 520 is separated from the first pressing part 320, and therefore the pivotal part 410 of the movable component 400 is for pivoting relative to the fixing component 100 along the adjusting groove 330 so as to adjust the pivoting angle θ2. As a result, it is favorable for adjusting a monitoring range of the camera body 20 by adjusting the pivoting angle θ2.

Figure 5:
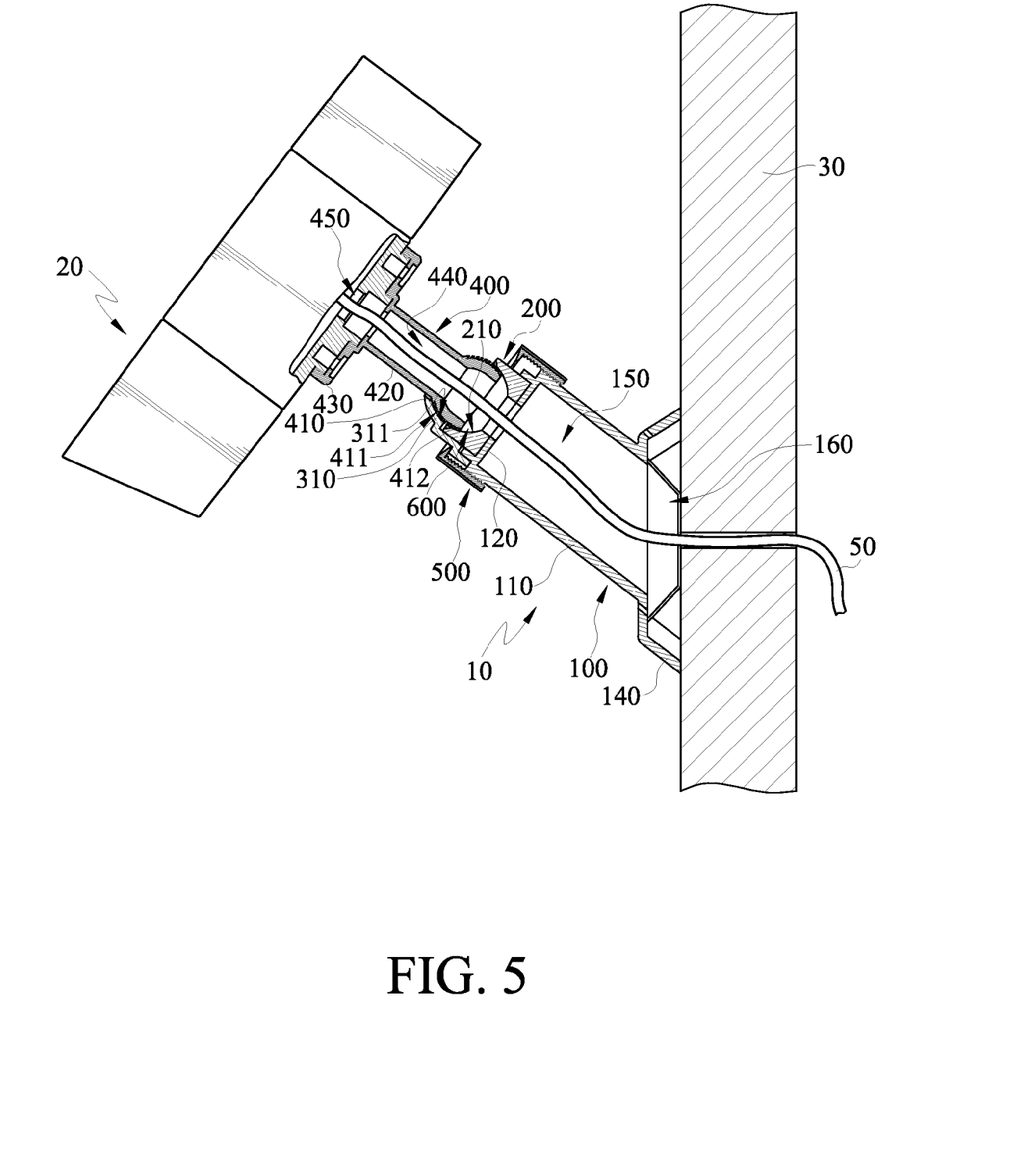
FIG. 5 is another cross-sectional view of the camera device whose angle is adjusted in FIG. 1.
Figure 6:
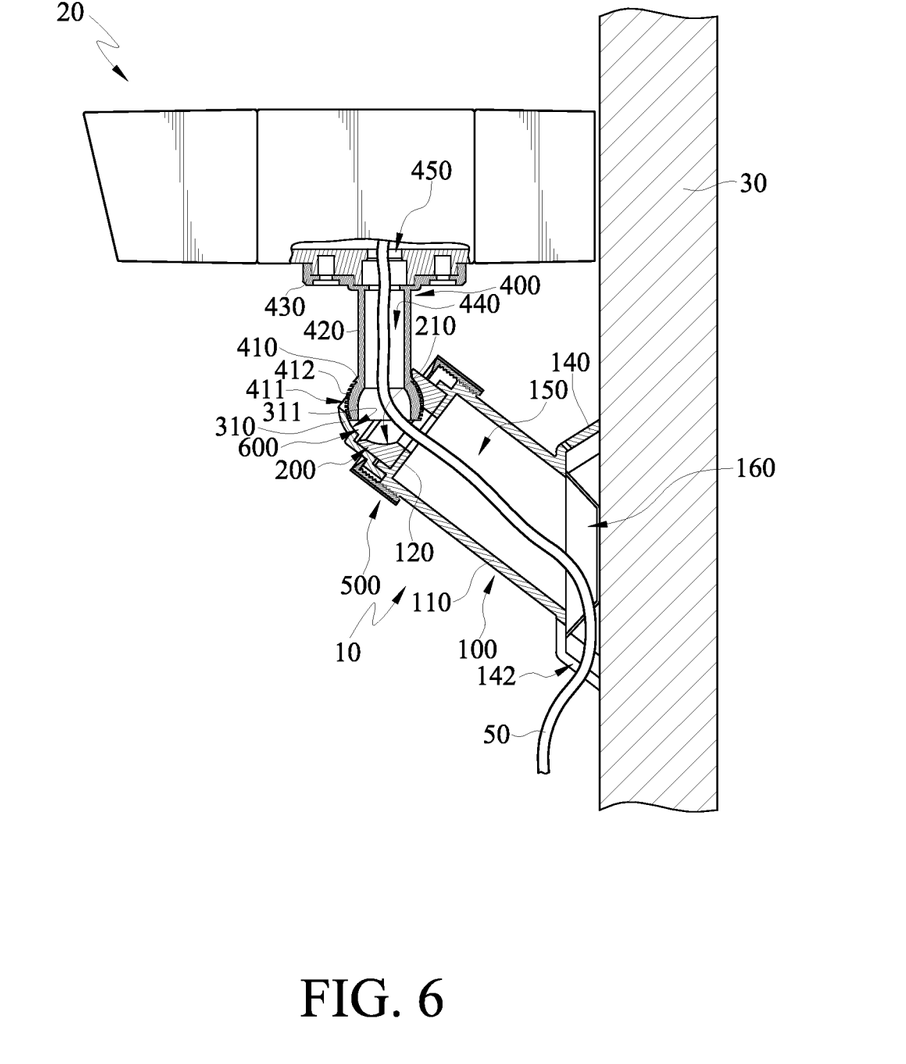
FIG. 6 is a cross-sectional view of the camera device with a wire passing through it according to the first embodiment.
Figure 7:
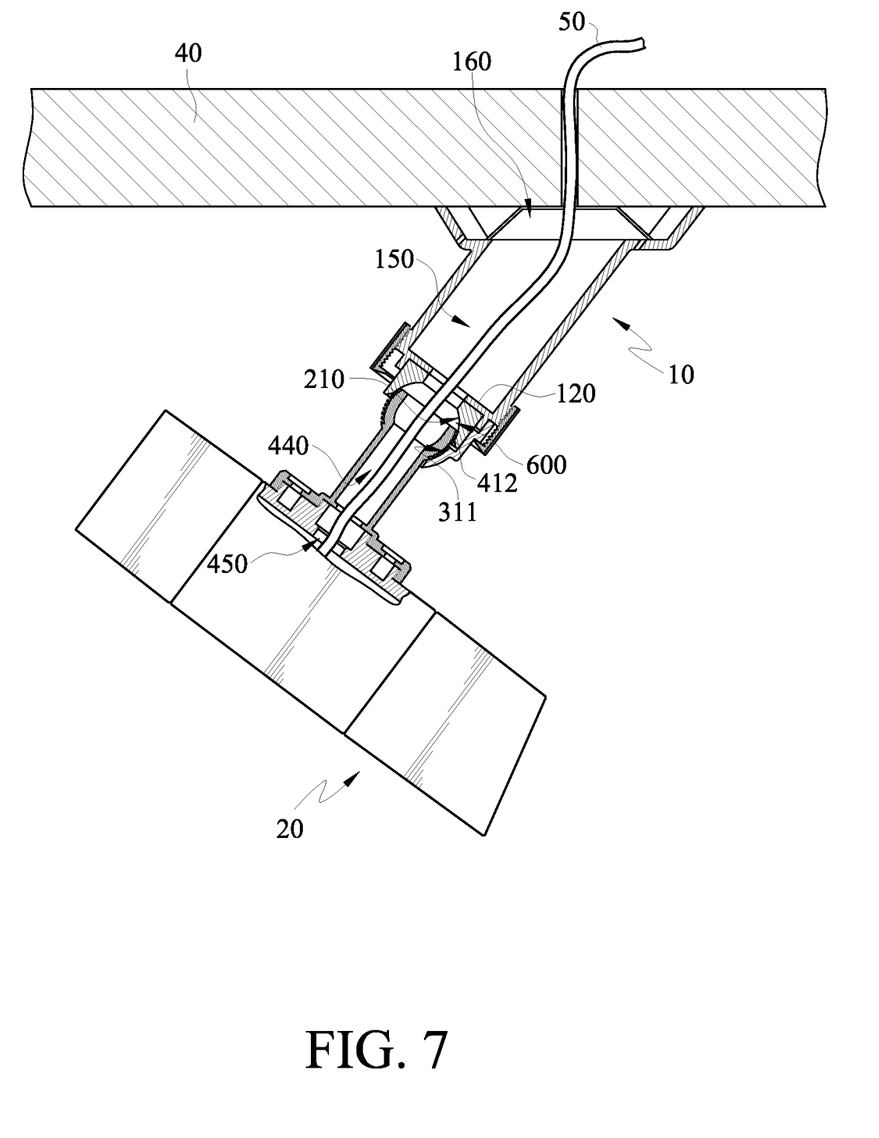
FIG. 7 is a cross-sectional view of the camera device disposed on a ceiling according to the first embodiment.

The following describes how to assemble and adjust the shooting direction of the camera device. Please refer to FIGS. 4, 5, 6 and 7. FIG. 5 is another cross-sectional view of the camera device whose angle is adjusted in FIG. 1. FIG. 6 is a cross-sectional view of the camera device with a wire passing through it according to the first embodiment. FIG. 7 is a cross-sectional view of the camera device disposed on a ceiling according to the first embodiment.

Figure 4:
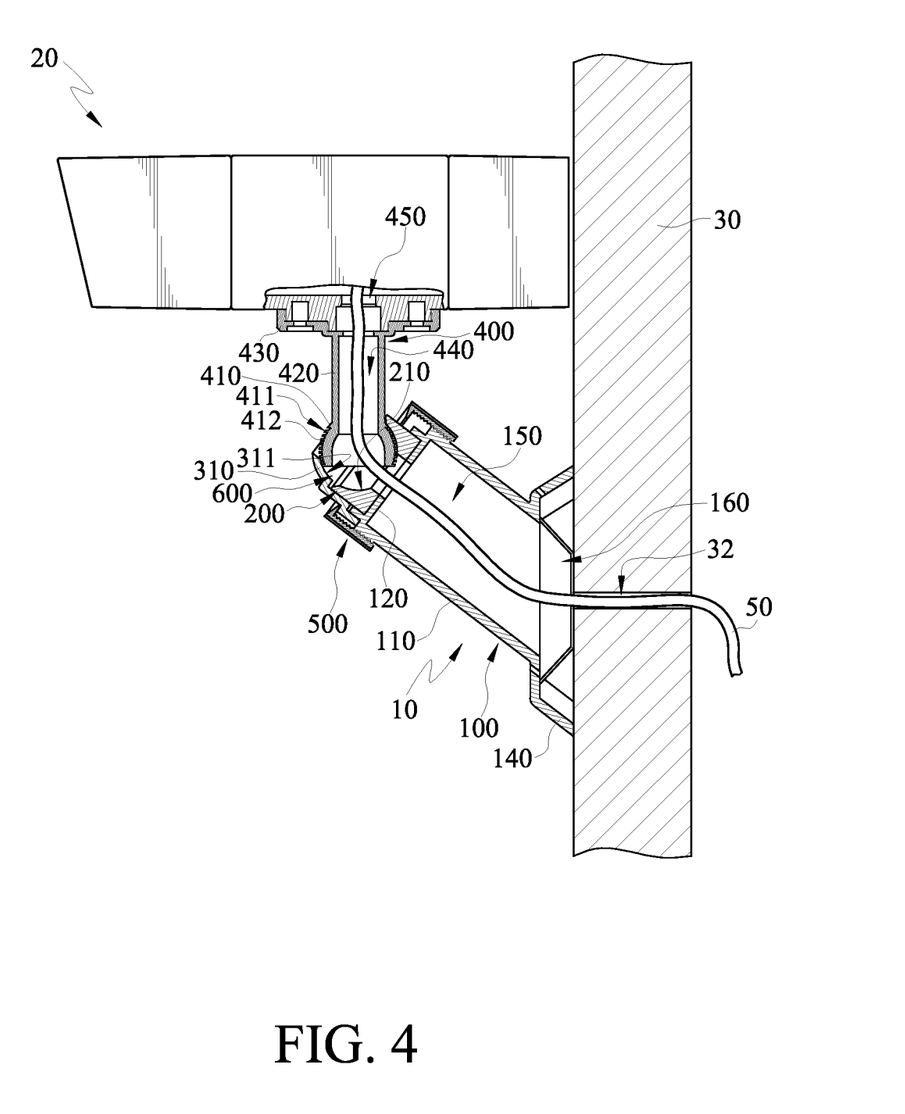
FIG. 4 is a cross-sectional view of adjusting an angle of the camera device in FIG. 1.

As shown in FIG. 4. In this embodiment, the movable bracket 10 is installed on a wall 30. The wall 30 has a penetration 32. When the camera body 20 needs to monitor an area in front of the wall 30, the fastening ring 500 is loosened and the movable component 400 is headed up so that the camera body 20 is for capturing the image of the area in front of the wall 30. After the movable component 400 is adjusted, the fastening ring 500 is locked so as to fix the pivoting angle θ2.

Furthermore, the wire 50 connected to the camera body 20 passes through the first wire opening 160, the first wire channel 150, the second wire channel 440, the second wire opening 450 and the penetration 32 so as to be guided to a rear side of the wall 30. Therefore, it is favorable for preventing the cable 50 from being exposed to the outside so as to prevent the cable 50 from damage or vandalism.

As shown in FIG. 5, when the camera body 20 needs to monitor the area located at the lower side of the wall 30, the movable component 400 is adjusted via the aforementioned steps so that the camera body 20 is headed down for capturing the image of the area at the lower side of the wall 30.

As shown in FIG. 6, when the wall 30 does not have the penetration 32 (e.g., it is inconvenient for drilling the wall 30), the cable 50 located in the movable bracket 10 can pass through the wire hole 142 so as to be guided to the lower side of the wall 30. Therefore, the wire hole 142 is favorable for providing the camera body 20 with a power supply and/or a signal transmission which the camera body 20 needs.

As shown in FIG. 7, when the movable bracket 10 is installed on a ceiling 40, the movable component 400 is for pivoting relative to the fixing component 100 with various directions so that it is favorable for adjusting the monitoring range of the camera body 20.

In this embodiment, the movable bracket 10 is installed on the wall 30 or the ceiling, but the disclosure is not limited thereto. In some other embodiments, the movable bracket 10 can be installed on a table or a floor.

Figure 8:
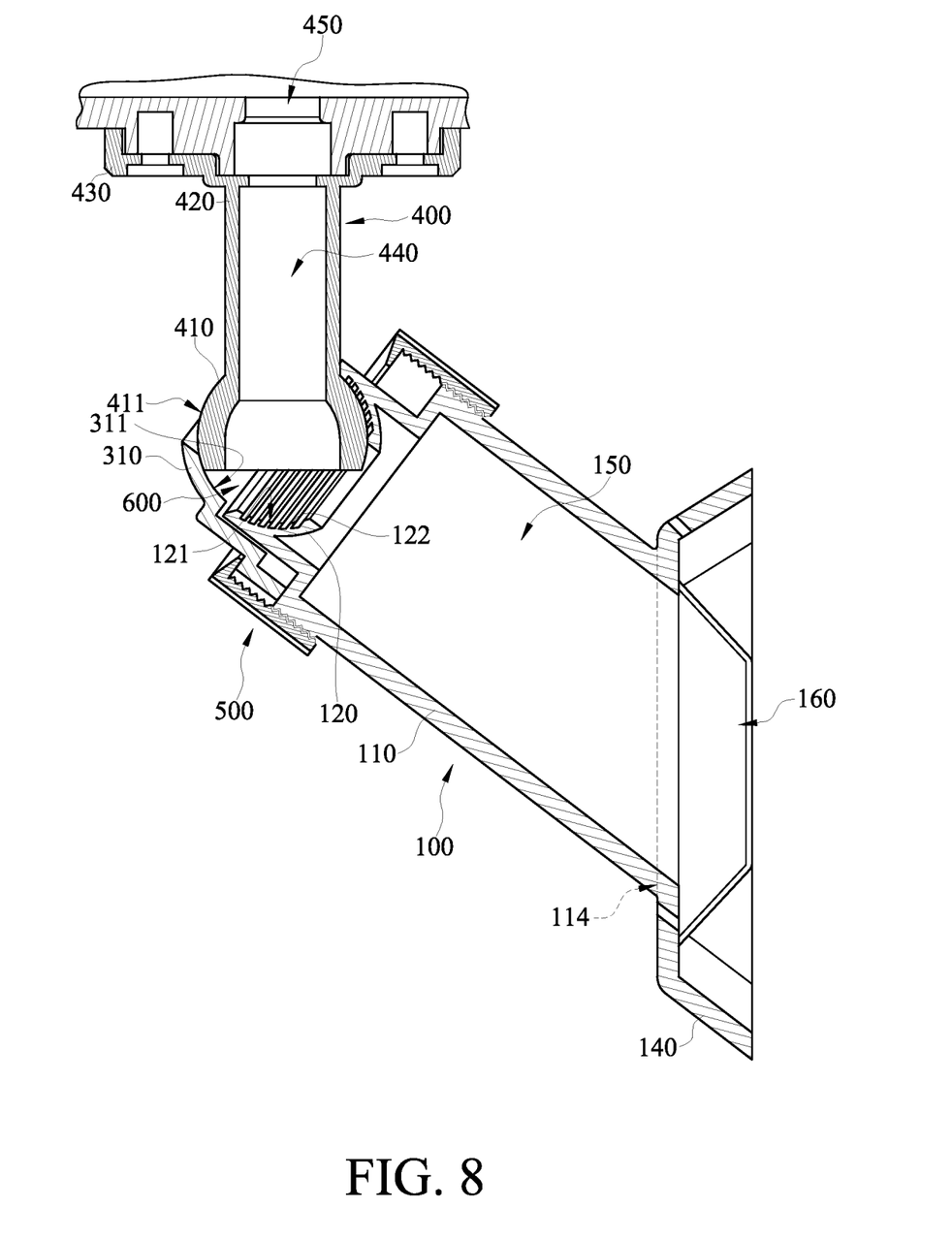
FIG. 8 is a cross-sectional view of a camera device according to a second embodiment.

The movable bracket can optionally comprise the elastic component. Please refer to FIG. 8, which is a cross-sectional view of a camera device according to a second embodiment. Since this embodiment is similar to the first embodiment, only the differences will be illustrated hereafter. In this embodiment, the movable bracket does not comprise the elastic component 200, and the pivotal part 410 is interposed between the first interposing part 120 and the second interposing part 310. The pivotal part 410 has a hemispherical surface 411, the first interposing part 120 has a first curved surface 121, and the second interposing part 310 has a second curved surface 311. Both of the first curved surface 121 and the second curved surface 311 face towards the hemispherical surface 411. The first curved surface 121 and the second curved surface 311 together cover the pivotal part 410. The first interposing part 120 of the fixing component 100 further comprises a ribbed structure 122 located at the first curved surface 121, and the hemispherical surface 411 of the pivotal part 410 presses the ribbed structure 122 of the first interposing part 120. Therefore, the first curved surface 121 and the second curved surface 311 closely contact the hemispherical surface 411 so that the pivotal part 410 is tightly interposed within the pivoting space 600, thereby the movable component 400 is securely fixed to the fixing component 100. In the second embodiment, the ribbed structure 122 is located at the first curved surface 121, but not located at the pivotal part 410 of the movable component 400.

The elastic component can be disposed on the movable component instead of being interposed between the first interposing part and the second interposing part. Please refer to FIG. 9, which is a cross-sectional view of a camera device according to a third embodiment. Since this embodiment is similar to the first embodiment, only the differences will be illustrated hereafter. In this embodiment, the pivotal part 410 has a groove 413 located at the hemispherical surface 411. The elastic component 200 is not interposed between the first interposing part 120 and the second interposing part 310. Instead, the elastic component 200 surrounds the groove 413 of the pivotal part 410. The first curved surface 121 and the second curved surface 311 together cover the pivotal part 410 and the elastic component 200. In this embodiment, an elasticity of the elastic component 200 is favorable for securely fixing the movable component 400 to the fixing component 100. Furthermore, it is favorable for reducing a friction between the pivotal part 410 and the first interposing part 120/the second interposing part 310.

Figure 9:
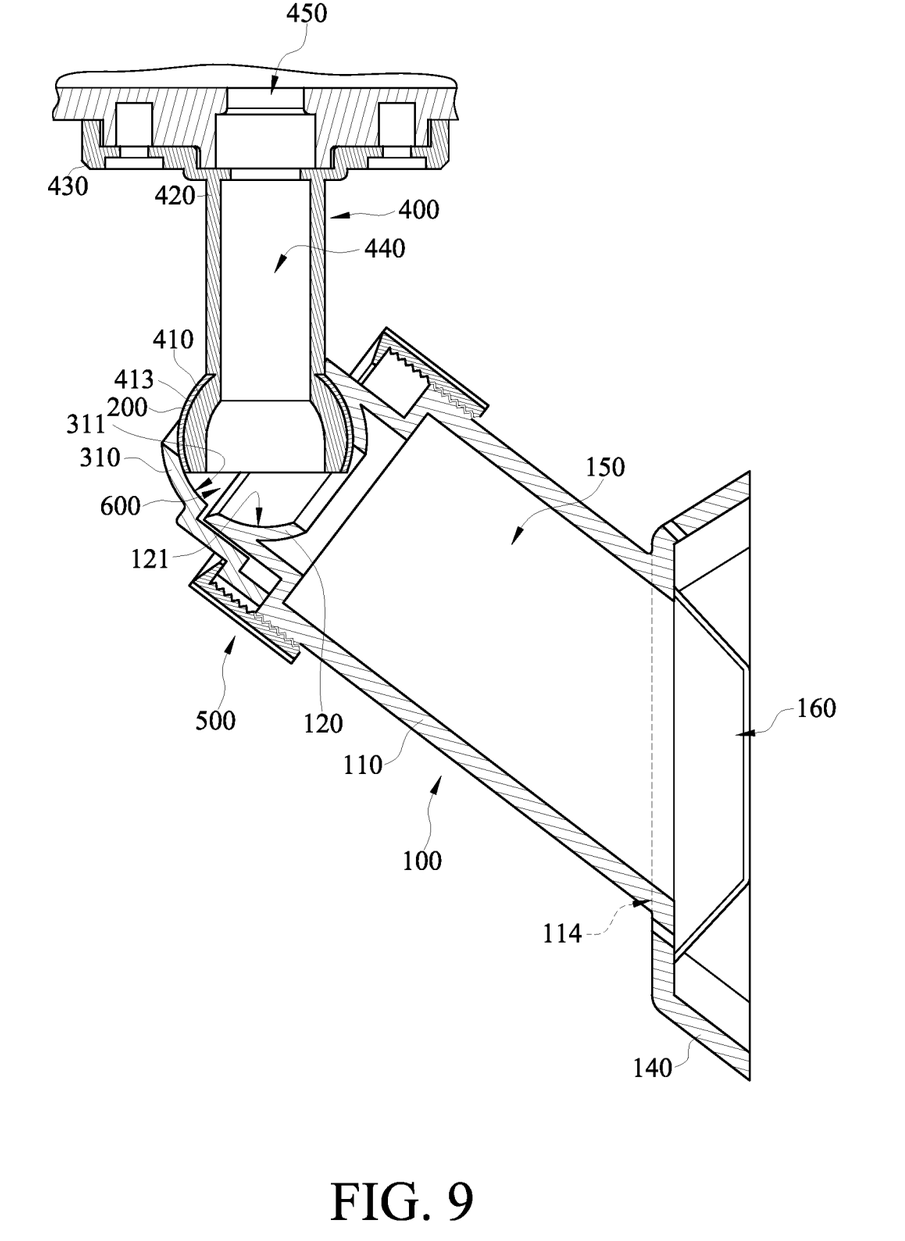
FIG. 9 is a cross-sectional view of a camera device according to a third embodiment.

In this embodiment, the elastic component 200 surrounds the groove 413 of the pivotal part 410, but the disclosure is not limited thereto. In some other embodiments, the pivotal part 410 does not have the groove 413, and the elastic component 200 directly surrounds the hemispherical surface 411 of the pivotal part 410.

According to the disclosure, the fastening ring is detachably screwed to the fixing component. When the fastening ring is loosed from the fixing component, a user is able to hold the movable component with one of his/her hands so that the movable component is for pivoting relative to the fixing component, thereby the pivoting angle can be adjustable. When the pivoting angle is adjusted to a value the user needs, the user screw the fastening ring with the other hand so that the fastening ring is locked to the fixing component, thereby the movable component is fixed with desired pivoting angle.

Furthermore, the movable component is for pivoting relative to the fixing component along the adjusting groove, and the covering component is for rotating relative to the fixing component with the axis of the fixing component as the center of rotation. Therefore, the position of the adjusting groove can be adjusted so that the movable component is for pivoting relative to the fixing component along various directions.

What is claimed is:
1. A movable bracket, comprising:
   a fixing component comprising a base, a main body extending along an axis from the base, a first interposing part, and a first screwing part, the first interposing part located at an end of the main body, the first screwing part located at an outer surface of the main body, the main body having a connecting surface, the base has a combining surface away from the main body, the main body is unmovably fixed to the base via the connecting surface, such that a normal direction of the combining surface and the axis enclosing an angle, and the angle is an acute angle;

a covering component comprising a second interposing part and a first pressing part that are connected to each other, the covering component covering the first interposing part so as to form a pivoting space between the first interposing part and the second interposing part, the covering component having an adjusting groove, and the adjusting groove extending through two sides of the second interposing part so as to be connected to the pivoting space;

a movable component comprising a pivotal part and an assembling part that are opposite to each other, the movable component passing through the adjusting groove so that the assembling part is exposed to outside and the pivotal part is located in the pivoting space, the pivotal part is interposed between the first interposing part and the second interposing part, the movable component pivots relative to the fixing component, the movable component and the axis enclose a pivoting angle, and a sum of the angle and the pivoting angle is up to 90 degrees; and a fastening ring comprising a ring body, a second pressing part and a second screwing part, the second pressing part is connected to an end of the ring body, the second screwing part is located on an inner surface of the ring body, the ring body is surrounding the main body so that the second screwing part is detachably screwed to the first screwing part, thereby the second pressing part presses the first pressing part so as to fix the pivotal part between the first interposing part and the second interposing part.

2. The movable bracket according to claim 1, wherein the main body has a connecting end and a pivotal end that are opposite to each other, the connecting surface is located at the connecting end, and both of the first interposing part and the first screwing part are located at the pivotal end of the main body.

3. The movable bracket according to claim 2, wherein the fixing component has a first wire channel, the first wire channel extends through the main body and the base so as to form a first wire opening at the base, the movable component has a second wire channel, the second wire channel extends through the pivotal part and the assembling part so as to form a second wire opening at the assembling part, and the first wire channel is communicated with the second wire channel.

4. The movable bracket according to claim 3, wherein the base has at least one wire hole communicated with the first wire channel.

5. The movable bracket according to claim 1, wherein the second screwing part is screwed to the first screwing part so that the fastening ring has a fastening position and a releasing position, the second pressing part presses the first pressing part when the fastening ring is located at the fastening position, the second pressing part is separated from the first pressing part when the fastening ring is located at the releasing position.

6. The movable bracket according to claim 5, wherein when the fastening ring is located at the releasing position, the covering component is for rotating relative to the main body with the axis of the fixing component being a center of rotation.

7. The movable bracket according to claim 5, wherein the movable component further comprises a connecting part connected to the pivotal part and the assembling part, the connecting part is located between the pivotal part and the assembling part, the connecting part is for pivoting relative to the fixing component along the adjusting groove.

8. The movable bracket according to claim 1, wherein the pivotal part has a hemispherical surface, the first interposing part has a first curved surface, the second interposing part has a second curved surface, the first curved surface and the second curved surface together cover the pivotal part, and both of the first curved surface and the second curved surface face towards the hemispherical surface.

9. The movable bracket according to claim 8, wherein the first interposing part of the fixing component comprises a ribbed structure located at the first curved surface, and the hemispherical surface of the pivotal part presses the ribbed structure of the first interposing part.

10. A camera device, comprising:
a movable bracket according to claim 1; and
a camera body disposed on the assembling part of the movable bracket, and the camera body being for capturing an image.

11. The camera device according to claim 10, wherein the main body has a connecting end and a pivotal end that are opposite to each other, the connecting surface is located at the connecting end, the base is connected to the main body via the connecting surface, and both of the first interposing part and the first screwing part are located at the pivotal end of the main body.

12. The camera device according to claim 11, wherein the fixing component has a first wire channel, the first wire channel extends through the main body and the base so as to form a first wire opening at the base, the movable component has a second wire channel, the second wire channel extends through the pivotal part and the assembling part so as to form a second wire opening at the assembling part, and the first wire channel is communicated with the second wire channel.

13. The camera device according to claim 12, wherein the base has at least one wire hole communicated with the first wire channel.

14. The camera device according to claim 10, wherein the second screwing part is screwed to the first screwing part so that the fastening ring has a fastening position and a releasing position, the second pressing part presses the first pressing part when the fastening ring is located at the fastening position, the second pressing part is separated from the first pressing part when the fastening ring is located at the releasing position.

15. The camera device according to claim 14, wherein when the fastening ring is located at the releasing position, the covering component is for rotating relative to the main body with the axis of the fixing component being a center of rotation.

16. The camera device according to claim 14, wherein the movable component further comprises a connecting part connected to the pivotal part and the assembling part, the connecting part is located between the pivotal part and the assembling part, the connecting part is for pivoting relative to the fixing component along the adjusting groove.

17. The camera device according to claim 10, wherein the pivotal part has a hemispherical surface, the first interposing part has a first curved surface, the second interposing part has a second curved surface, the first curved surface and the second curved surface together cover the pivotal part, and both of the first curved surface and the second curved surface face towards the hemispherical surface.

18. The camera device according to claim 17, wherein the first interposing part of the fixing component comprises a ribbed structure located at the first curved surface, and the hemispherical surface of the pivotal part presses the ribbed structure of the first interposing part.

19. The camera device according to claim 1, wherein the main body and the base are integrally formed.

* * * * *